United States Patent
Telfer et al.

(10) Patent No.: US 12,460,820 B1
(45) Date of Patent: Nov. 4, 2025

(54) FUELING PASSAGE ARRAY SEALING SYSTEM AND METHOD OF USE

(71) Applicant: Solar Turbines Incorporated, San Diego, CA (US)

(72) Inventors: Michael Telfer, San Diego, CA (US); Eric Christian Monson, San Diego, CA (US); Ramarao Venkat Bandaru, San Diego, CA (US); Gusheng Hu, San Diego, CA (US); Michael Lane, Lakeside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 19/190,948

(22) Filed: Apr. 28, 2025

(51) Int. Cl.
*F23R 3/00* (2006.01)
*F23R 3/28* (2006.01)

(52) U.S. Cl.
CPC .................................... *F23R 3/283* (2013.01)

(58) Field of Classification Search
None
See application file for complete search history.

(56) References Cited

U.S. PATENT DOCUMENTS

| | | | |
|---|---|---|---|
| 4,715,571 A * | 12/1987 | Soltow | F16L 3/22 |
| | | | 24/339 |
| 10,458,655 B2 * | 10/2019 | Boardman | B05B 7/00 |
| 2005/0001071 A1 | 1/2005 | Hashimoto et al. | |
| 2012/0279224 A1 * | 11/2012 | Bailey | F23R 3/286 |
| | | | 60/746 |
| 2017/0204996 A1 * | 7/2017 | Breda | H02G 3/32 |

FOREIGN PATENT DOCUMENTS

| | | |
|---|---|---|
| DE | 102014201854 | 8/2015 |
| DE | 102021203739 | 10/2022 |
| DE | 102022213512 | 6/2024 |

* cited by examiner

*Primary Examiner* — Edwin Kang

(57) ABSTRACT

A sealing system for a fuel injector is provided. The fuel injector includes a body defining a plurality of fuel passages. Each of the plurality of fuel passages is defined by a first portion of the body and a second portion of the body. The sealing system includes a sealing structure adapted to be disposed between the first portion and the second portion. The sealing structure extends circumferentially around a central axis of the fuel injector. The sealing structure includes a ring and a plurality of lobes. Each lobe from the plurality of lobes is adapted to accommodate and seal a corresponding fuel passage from the plurality of fuel passages. The sealing system also includes a plurality of mechanical fasteners adapted to couple the first portion with the second portion, and to apply a pressure on the sealing structure to seal the plurality of fuel passages.

20 Claims, 6 Drawing Sheets

FUELING PASSAGE ARRAY SEALING SYSTEM AND METHOD OF USE

TECHNICAL FIELD

The present disclosure relates to a fuel injector, a sealing system for the fuel injector, and a method of fuel injection.

BACKGROUND

An engine, such as a gas turbine engine, includes a fuel injector to direct a fuel and/or a mixture of air and fuel into a combustor of the engine under high temperature and pressure conditions. Conventionally, the fuel injector includes a number of fuel passages for passage of the fuel therethrough. One or more subcomponents or subassemblies of the fuel injector are coupled to each other to form the fuel passages.

In some cases, some amount of fuel may leak through a joint that is created on account of a coupling of the subcomponents or subassemblies. The leakage may result in an unintentional burning of fuel at the joint, which may damage the subcomponents or the subassemblies. Further, tight connections between different components may result in increased friction between the components that may be costly to repair. The repair and maintenance of the subcomponents or the subassemblies may increase operating costs of the engine.

Conventional sealing techniques for sealing of the fuel passages do not provide a required pressure distribution across the joint, thereby providing an ineffective sealing of the components and allowing leakage of fuel therethrough.

Published U.S. Patent Application 2005/001071 describes a fuel passage sealing structure of a fuel injection nozzle. The structure prevents leakage of a fuel between a first body such as an injector housing, and a second body such as a nozzle body by increasing a seal surface pressure.

SUMMARY

In an aspect of the present disclosure, a sealing system for a fuel injector is provided. The fuel injector includes a body defining a plurality of fuel passages. Each of the plurality of fuel passages is defined by a first portion of the body and a second portion of the body. The sealing system includes a sealing structure adapted to be disposed between the first portion and the second portion. The sealing structure extends circumferentially around a central axis of the fuel injector. The sealing structure includes a ring and a plurality of lobes. Each lobe from the plurality of lobes is adapted to accommodate and seal a corresponding fuel passage from the plurality of fuel passages. The sealing system also includes a plurality of mechanical fasteners adapted to couple the first portion with the second portion. Each of the plurality of mechanical fasteners is adapted to apply a pressure on the sealing structure to seal the plurality of fuel passages.

In another aspect of the present disclosure, a fuel injector is provided. The fuel injector includes a body defining a plurality of fuel passages. The body extends circumferentially around a central axis of the fuel injector. The body includes a first portion and a second portion. Each of the plurality of fuel passages is defined by the first portion of the body and the second portion of the body. The fuel injector also includes a sealing system that seals the plurality of fuel passages. The sealing system includes a sealing structure disposed between the first portion and the second portion. The sealing structure extends circumferentially around the central axis of the fuel injector. The sealing structure includes a ring and a plurality of lobes. Each lobe from the plurality of lobes accommodates and seals a corresponding fuel passage from the plurality of fuel passages. The sealing system also includes a plurality of mechanical fasteners that removably couple the first portion with the second portion. Each of the plurality of mechanical fasteners applies a pressure on the sealing structure to seal the plurality of fuel passages.

In yet another aspect of the present disclosure, a method of fuel injection is provided. The method includes providing a fuel injector. The fuel injector includes a body defining a plurality of fuel passages. Each of the plurality of fuel passages is defined by a first portion of the body and a second portion of the body. The fuel injector includes a sealing structure disposed between the first portion and the second portion. The sealing structure extends circumferentially around a central axis of the fuel injector. The sealing structure includes a ring and a plurality of lobes. Each lobe from the plurality of lobes accommodates and seals a corresponding fuel passage from the plurality of fuel passages. The fuel injector also includes a plurality of mechanical fasteners that removably couple the first portion with the second portion. The method also includes applying, via the plurality of mechanical fasteners, a pressure on the sealing structure. The method further includes operating the fuel injector. The method includes causing a fuel flow through the plurality of fuel passages. The method also includes sealing, via the sealing structure and the pressure applied on the sealing structure via the plurality of mechanical fasteners, the plurality of fuel passages to prevent a leakage of the fuel flow through a joint between the first portion and the second portion.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
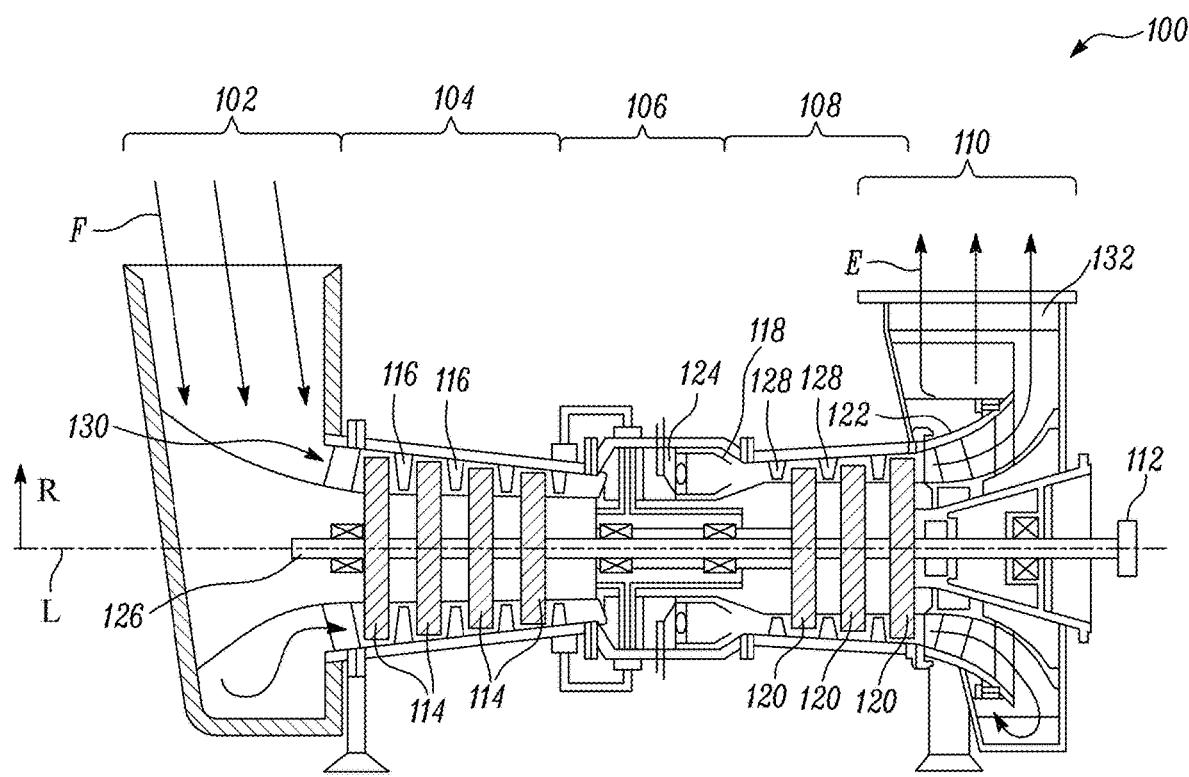
FIG. 1 is a schematic cross-sectional view of an exemplary engine.

To begin a detailed description, reference is made to FIG. 1, which illustrates an engine 100 in which the devices, systems, and methods of the present disclosure may be implemented. The engine 100 is a gas turbine engine 100 herein. The engine 100 may be hereinafter interchangeably referred to as "the gas turbine engine 100".

The gas turbine engine 100 includes a shaft 126 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to the longitudinal axis L, such as a radial axis R in FIG. 1. Thus, the term "radially outward" or "distal" should be understood to mean farther from or away from the longitudinal axis L, whereas the term "radially inward" or "proximal" should be understood to mean closer or towards the longitudinal axis L. As used herein, the term "radial" will refer to any axis or direction that is substantially perpendicular to the longitudinal axis L, and the term "axial" will refer to any axis or direction that is substantially parallel to the longitudinal axis L.

In an embodiment, the gas turbine engine 100 includes, from an upstream end to a downstream end, an inlet 102, a compressor 104, a combustor 106, a turbine 108, and an exhaust outlet 110. In addition, the downstream end of the gas turbine engine 100 may include a power output coupling 112. One or more, including potentially all, of these components of the gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

The inlet 102 may funnel a working fluid F (e.g., the primary gas, such as air) into an annular flow path 130 around the longitudinal axis L. The working fluid F flows through the inlet 102 into the compressor 104. While the working fluid F is illustrated as flowing into the inlet 102 from a particular direction and at an angle that is substantially orthogonal to the longitudinal axis L, it should be understood that the inlet 102 may be configured to receive the working fluid F from any direction and at any angle that is appropriate for the particular application of the gas turbine engine 100. While the working fluid F will primarily be described herein as air, it should be understood that the working fluid F could include other fluids, including other gases.

The compressor 104 may include a series of compressor rotor assemblies 114 and stator assemblies 116. Each compressor rotor assembly 114 may include a rotor disk that is circumferentially populated with a number of rotor blades. The rotor blades in a rotor disk are separated, along an axial axis that is parallel to the longitudinal axis L, from the rotor blades in an adjacent disk by a stator assembly 116. The compressor 104 compresses the working fluid F through a series of stages corresponding to each compressor rotor assembly 114. The compressed working fluid F then flows from the compressor 104 into the combustor 106.

Figure 2:
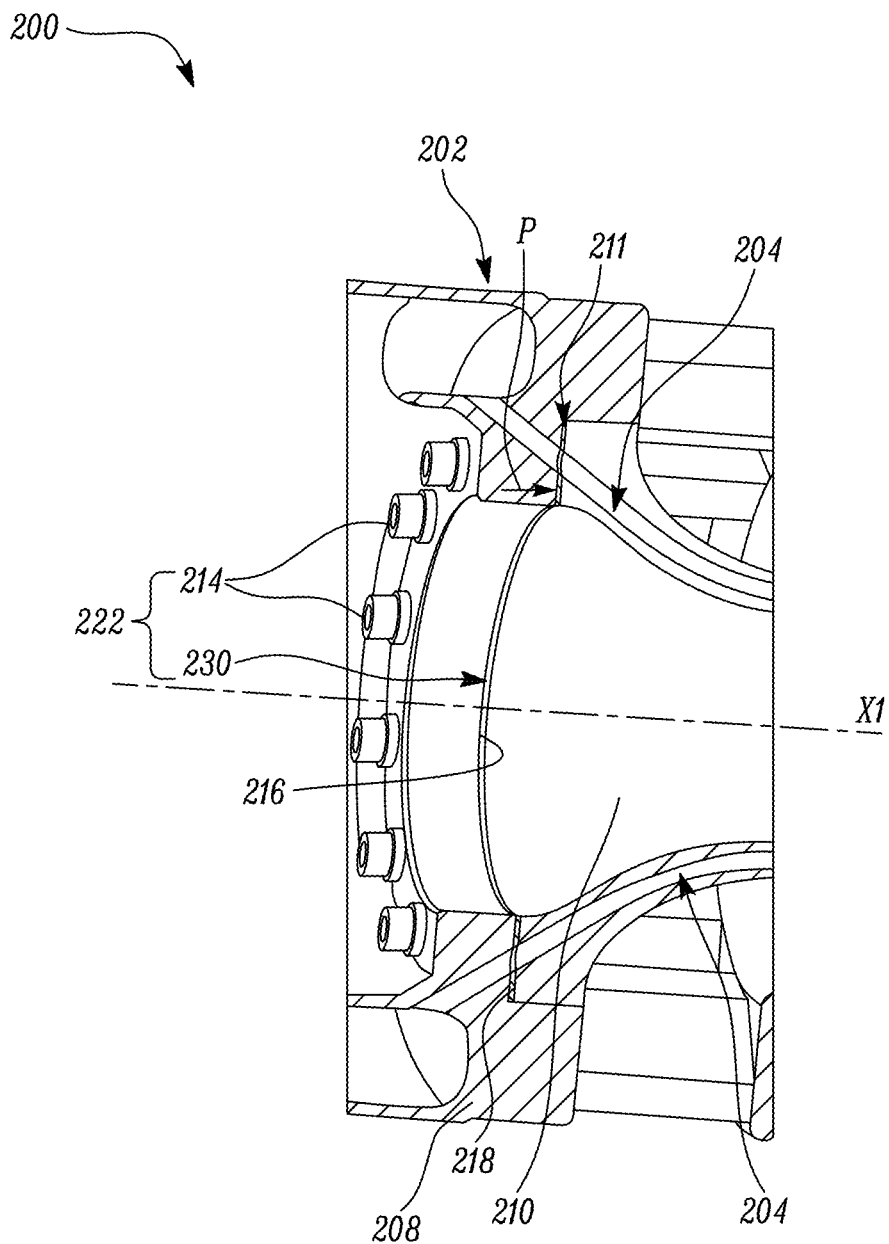
FIG. 2 is a schematic cross-sectional view of a portion of a fuel injector for the engine of FIG. 1, according to an example of the present disclosure.

The combustor 106 may include a combustor case 118 that houses a fuel injection system 124. The fuel injection system 124 may generally a number of fuel injectors 200 (one of which is shown in FIG. 2) that may be arranged circumferentially around the longitudinal axis L within the combustor case 118 at equidistant intervals. The combustor case 118 diffuses the working fluid F, and the fuel injection system 124 injects fuel into the working fluid F. In an exemplary embodiment, the injected fuel may be a gaseous fuel including hydrogen or hydrogen blend(s). This injected fuel is ignited to produce a combustion reaction in one or more combustion chambers 136. The product of the combustion reaction, i.e., combustion gases, drives the turbine 108.

The turbine 108 may include one or more turbine rotor assemblies 120 and stator assemblies 128 (e.g., nozzles). Each turbine rotor assembly 120 may correspond to one of a number or series of stages. The turbine 108 extracts energy from the combusting fuel-gas mixture as it passes through each stage. The energy extracted by the turbine 108 may be transferred via the power output coupling 112 (e.g., to an external system), as well as to the compressor 104 via the shaft 126.

The exhaust E from the turbine 108 may flow into the exhaust outlet 110. The exhaust outlet 110 may include an exhaust diffuser 122, which diffuses the exhaust E, and an exhaust collector 132 which collects, redirects, and outputs exhaust E. It should be understood that the exhaust E, output by the exhaust collector 132, may be further processed, for example, to reduce harmful emissions, recover heat, and/or the like. In addition, while the exhaust E is illustrated as flowing out of the exhaust outlet 110 in a specific direction and at an angle that is substantially orthogonal to the longitudinal axis L, it should be understood that the exhaust outlet 110 may be configured to output the exhaust E towards any direction and at any angle that is appropriate for the particular application of the gas turbine engine 100.

FIG. 2 is a schematic cross-sectional view of the fuel injector 200 for the engine 100 of FIG. 1. The view illustrated in FIG. 2 has been simplified to only illustrate components of interest. The fuel injector 200 defines a central axis "X1". The fuel injector 200 includes a body 202 defining a number of fuel passages 204. The number of fuel passages 204 may facilitate transfer of the fuel received from a fuel intake (not shown) for ignition towards the combustor 106 (see FIG. 1).

The body 202 extends circumferentially around the central axis "X1" of the fuel injector 200. The body 202 may include a number of sub-components that are coupled to each other. In the illustrated example of FIG. 2, the body 202 includes a first portion 208 and a second portion 210. The second portion 210 is coupled with the first portion 208. In an example, the first portion 208 is a manifold of the fuel injector 200, and the second portion 210 is a tube of the fuel injector 200. The second portion 210 is removably coupled with the first portion 208 herein. The first portion 208 and the second portion 210 are connected together to form a joint 211. Further, the first portion 208 and the second portion 210 are axially disposed relative to each other. Each of the number of fuel passages 204 is defined by the first portion 208 of the body 202 and the second portion 209 of the body 202.

Further, the first portion 208 defines a first engaging surface 216. The first portion 208 further defines a number of first through-holes (not shown herein). Furthermore, the second portion 210 defines a second engaging surface 218. The second portion 210 further defines a number of second through-holes 215 (shown in FIG. 4). It should be noted that the fuel injector 200 may have any shape, design, and combination of components, without any limitations.

The fuel injector 200 further includes a sealing system 222. The sealing system 222 described herein can be used in different types of fuel injectors that have fuel passages defined by two or more sub-components. The sealing system 222 seals the number of fuel passages 204 in the fuel injector 200. The sealing system 222 includes a sealing structure 230. The sealing structure 230 is disposed between the first portion 208 and the second portion 210. The sealing structure 230 engages with the first portion 208 at the first engaging surface 216. Further, the sealing structure 230 engages with the second portion 210 at the second engaging surface 218. Furthermore, the sealing structure 230 is disposed between the first engaging surface 216 of the first portion 208 and the second engaging surface 218 of the second portion 210 to prevent leakage of the fuel.

The sealing structure 230 extends circumferentially around the central axis "X1" of the fuel injector 200. The sealing structure 230 is made of a metal or a metal alloy. In an example, the sealing structure 230 is made of a Monel alloy. The sealing structure 230 may be made of a nickel and copper alloy. It should be noted that the present disclosure is not limited by a material of the sealing structure 230.

The sealing system 222 further includes a number of mechanical fasteners 214. The number of mechanical fasteners 214 couple the first portion 208 with the second portion 210. Each of a first through-hole (not shown) in the first portion 208 and a second through-hole 215 (see FIG. 4) are in alignment with each other to receive a corresponding mechanical fastener 214 to removably couple the first portion 208 and the second portion 210. Accordingly, the number of mechanical fasteners 214 form the joint 211 after coupling the first portion 208 and the second portion 210.

Each of the number of mechanical fasteners 214 applies a pressure "P" on the sealing structure 230 to seal the number of fuel passages 204. Specifically, the mechanical fasteners 214 applies the pressure "P" on the first portion 208 as well as the sealing structure 230 to sealingly engage the first portion 208, the sealing structure 230, and the second portion 210, thereby creating the leak free joint 211.

Figure 3:
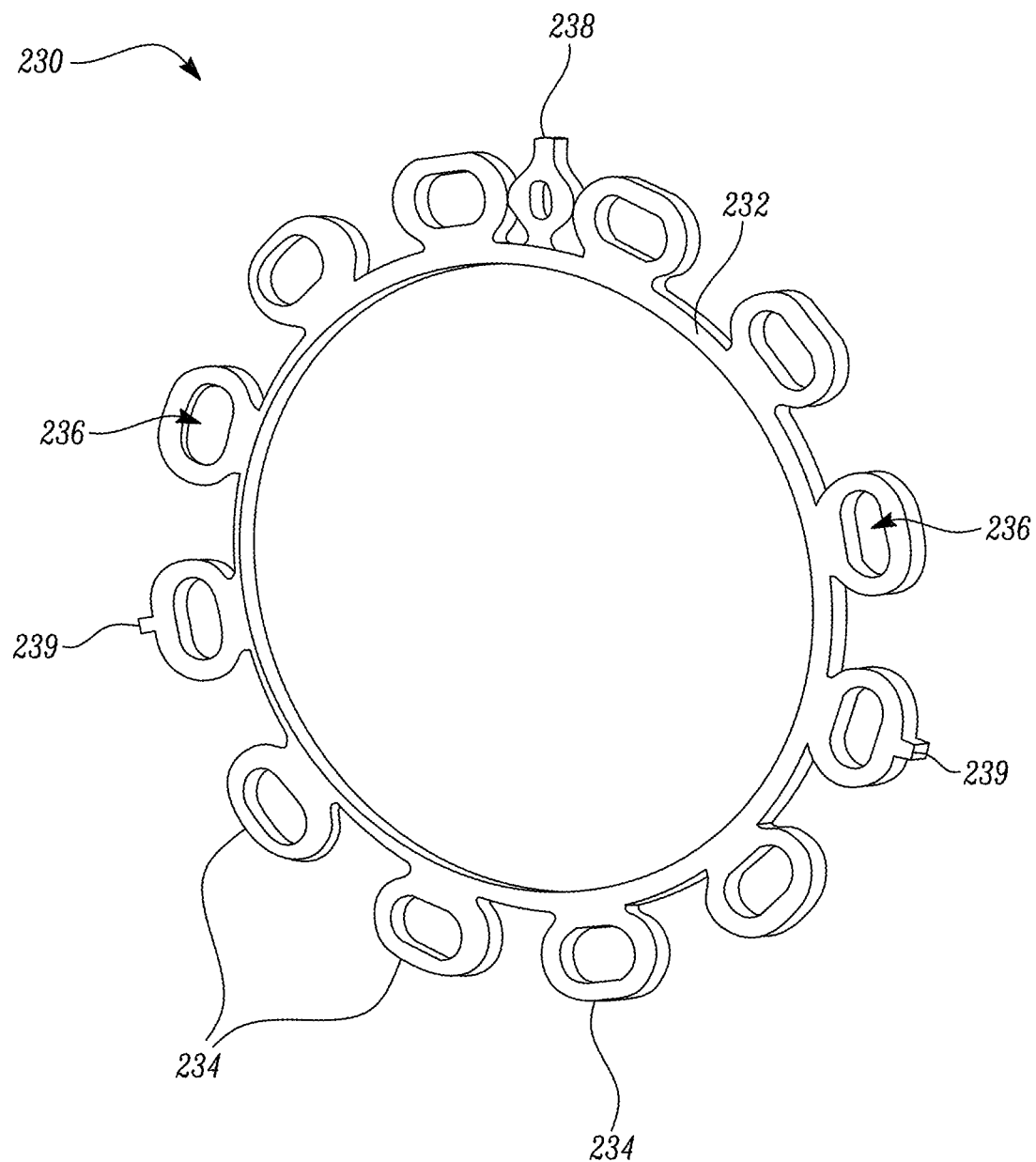
FIG. 3 is a schematic perspective view of a sealing structure of the fuel injector of FIG. 2, according to an example of the present disclosure.

FIG. 3 is a schematic perspective view of the sealing structure 230 of the fuel injector 200. The sealing structure 230 includes a ring 232 and a number of lobes 234. In the illustrated example of FIG. 3, the ring 232 is circular in shape. However, the ring 232 may have an elliptical shape, an oval shape, a square shape, a rectangular shape, or any other arbitrary shape, without any limitations. The present disclosure is not limited by the shape of the ring 232.

Each lobe 234 from the number of lobes 234 accommodates and seals a corresponding fuel passage 204 (see FIG. 2) from the number of fuel passages 204. Specifically, each lobe 234 seals an area around the corresponding fuel passage 204 to prevent a leakage of the fuel through the joint 211 (see FIG. 2) between the first portion 208 (see FIG. 2) and the second portion 210 (see FIG. 2). Thus, the number of lobes 234 prevent the leakage of the fuel through the joint 211 created by the first portion 208 and the second portion 210. Accordingly, the sealing structure 230 may include as many number of the number of lobes 234 as a number of fuel passages 204 in the fuel injector 200.

Each of the number of lobes 234 includes an opening 236. The opening 236 accommodates the corresponding fuel passage 204 from the number of fuel passages 204. The opening 236 has a shape. The shape of the opening 236 of each of the number of lobes 234 corresponds to a shape of each of the number of fuel passages 204. The opening 236 has any one of a circular shape, an elliptical shape, an oval shape, a kidney bean shape, and a polygon shape. In the illustrated example of FIG. 3, each opening 236 is oval in shape. In other examples, each opening 236 may have a race-track shape, or any other shape based on a shape of the fuel passage 204. The present disclosure is not limited by the shape of the opening 236.

The sealing structure 230 further includes one or more indicators 238, 239 extending from the ring 232 and/or one or more lobes 234 from the number of lobes 234. The one or more indicators 238, 239 allow a correct positioning of the sealing structure 230 relative to the first portion 208 and the second portion 210. The indicator 238 extends radially from the ring 232. Further, the indicators 239 extend radially from the corresponding lobes 234.

Figure 4:
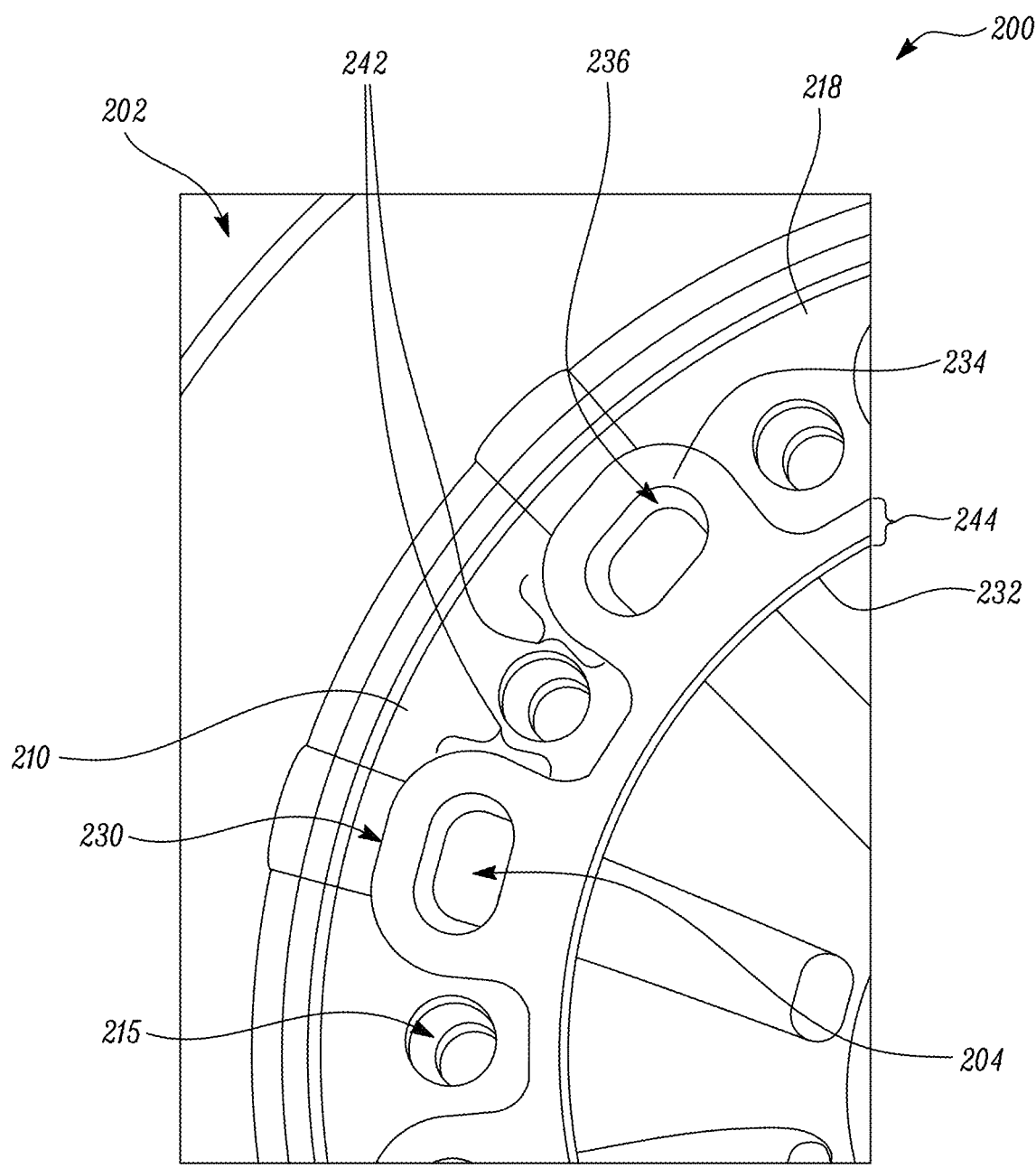
FIG. 4 is a schematic cross-sectional view of the sealing structure of FIG. 3.

FIG. 4 is a schematic cross-sectional view of the sealing structure 230 of FIG. 3 and the second portion 210 of the fuel injector 200 of FIG. 2. As shown in FIG. 4, the number of lobes 234 are disposed such that each mechanical fastener 214 from the number of mechanical fasteners 214 is disposed between two circumferentially adjacent lobes 234 from the number of lobes 234. In other words, each of the number of lobes 234 and each of the number of mechanical fastener 214 are circumferentially arranged around the central axis "X1" in an alternate manner.

Referring to FIGS. 2 to 4, each of the number of mechanical fasteners 214 applies the pressure "P" on the sealing structure 230 when the first portion 208 and the second portion 210 are connected to seal the number of fuel passages 204. The applied pressure "P" is maximum surrounding the fuel passage 204 and on the number of lobes 234, while the pressure "P" is minimum on the ring 232 of the sealing structure 230.

Referring now to FIG. 4, a first region 242 of the sealing structure 230 and a second region 244 of the sealing structure 230 is illustrated. The first region 242 experiences a high pressure while the second region 244 experiences a lower pressure. It is to be noted that the first region 242 is defined by the number of lobes 234 and the second region 244 is defined by the ring 232. Hence, a desired pressure to seal the number of fuel passages 204 is attained at the first region 242 of the number of lobes 234 to provide an effective sealing of the number of fuel passages 204 in order to prevent the leakage of the fuel from the joint 211.

Figure 5:
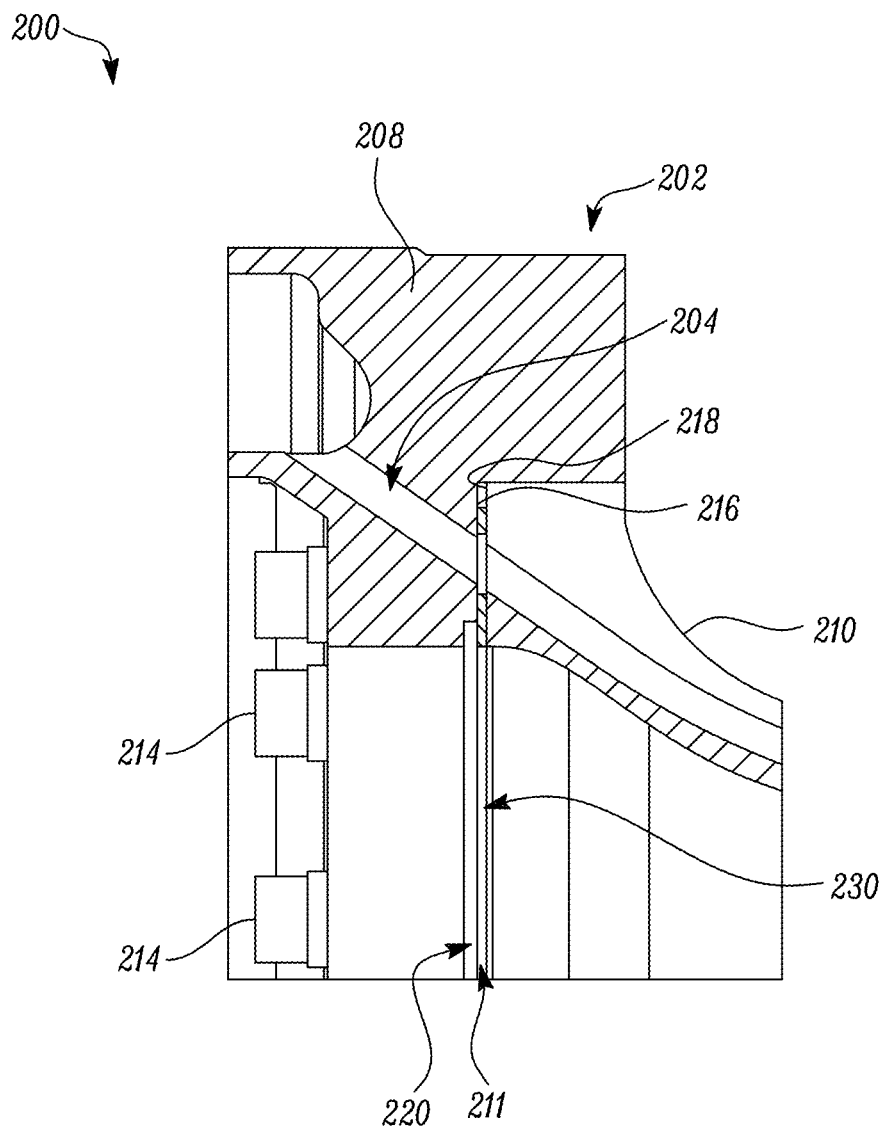
FIG. 5 is a schematic cross-sectional view illustrating a portion of the fuel injector of FIG. 2.

FIG. 5 is a schematic cross-sectional view illustrating a portion of the fuel injector 200 of FIG. 2. As illustrated in FIG. 5, in some examples, the first engaging surface 216 defines a cut-out portion 220. The cut-out portion 220 isolates the ring 232 of the sealing structure 230 from the first portion 208. Accordingly, when the first portion 208 is connected with the second portion 210 having the sealing structure 230 therebetween, the first engaging surface 216 of the first portion 208 does not make contact with the ring 232 of the sealing structure 230, and hence, the ring 232 may bear a minimum pressure or no pressure, while the number of lobes 234 may attain the desired pressure to seal the number of fuel passages 204.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure describes the sealing system 222 for the fuel injector 200 having the number of fuel passages 204. Each of the number of fuel passages 204 is defined by the first portion 208 of the fuel injector 200 and the second portion 210 of the fuel injector 200. The sealing system 222 includes the sealing structure 230 that is disposed between the first portion 208 and the second portion 210. The sealing structure 230 includes the ring 232 and the number of lobes 234. Each lobe 234 from the number of lobes 234 accommodates and seals the corresponding fuel passage 204 from the number of fuel passages 204. The number of lobes 234 of the sealing structure 230 may prevent leakage of the fuel flowing through the number of fuel passages 204. Hence, an inadvertent burning of fuel at the joint 211 between the first portion 208 and the second portion 210 may be prevented, which may in turn reduce a damage to the components of the fuel injector 200, may enhance a life of the fuel injector 200, and may eliminate costs that are otherwise incurred due to repair/replacement of damaged components.

The sealing system 222 further includes the number of mechanical fasteners 214 that couple the first portion 208 with the second portion 210. Each of the number of mechanical fasteners 214 applies the pressure "P" on the sealing structure 230 to seal the number of fuel passages 204. Further, the number of lobes 234 are disposed such that each mechanical fastener 214 from the number of mechanical fasteners 214 is disposed between two circumferentially adjacent lobes 234 from the number of lobes 234. The positioning of the number of mechanical fasteners 214 as explained herein may ensure an equal distribution of the pressure "P" applied to the sealing structure 230, thereby attaining the desired sealing of the number of fuel passages 204.

Each of the number of lobes 234 includes the opening 236. The opening 236 accommodates the corresponding fuel passage 204 from the number of fuel passages 204. The shape of the opening 236 of the number of lobes 234 corresponds to the shape of the number of fuel passages 204. Hence, the number of lobes 234 may ensure effective sealing of the number of fuel passages 204.

The sealing structure 230 further includes the one or more indicators 238, 239 extending from the ring 232 and/or the one or more lobes 234 from the number of lobes 234. The one or more indicators 238, 239 allow the correct positioning of the sealing structure 230 relative to the first portion 208 and the second portion 210. The one or more indicators 238, 239 may be utilized at a time of assembling the fuel injector 200 for placing the sealing structure 230 between the first portion 208 and the second portion 210. The one or more indicators 238, 239 may reduce an assembly time of the fuel injector 200 and may improve a confidence in an assembly of the fuel injector 200.

In some examples, the first engaging surface 216 defines the cut-out portion 220. The cut-out portion 220 isolates the ring 232 of the sealing structure 230 from the first portion 208. Hence, while the mechanical fasteners 214 apply the desired pressure "P" on the number of lobes 234, the ring 232 may remain under minimal or no pressure, thereby eliminating an unnecessary application of the pressure on the ring 232. The sealing structure 230 can be used to seal any type of fuel passage that is formed by two or more components.

Figure 6:
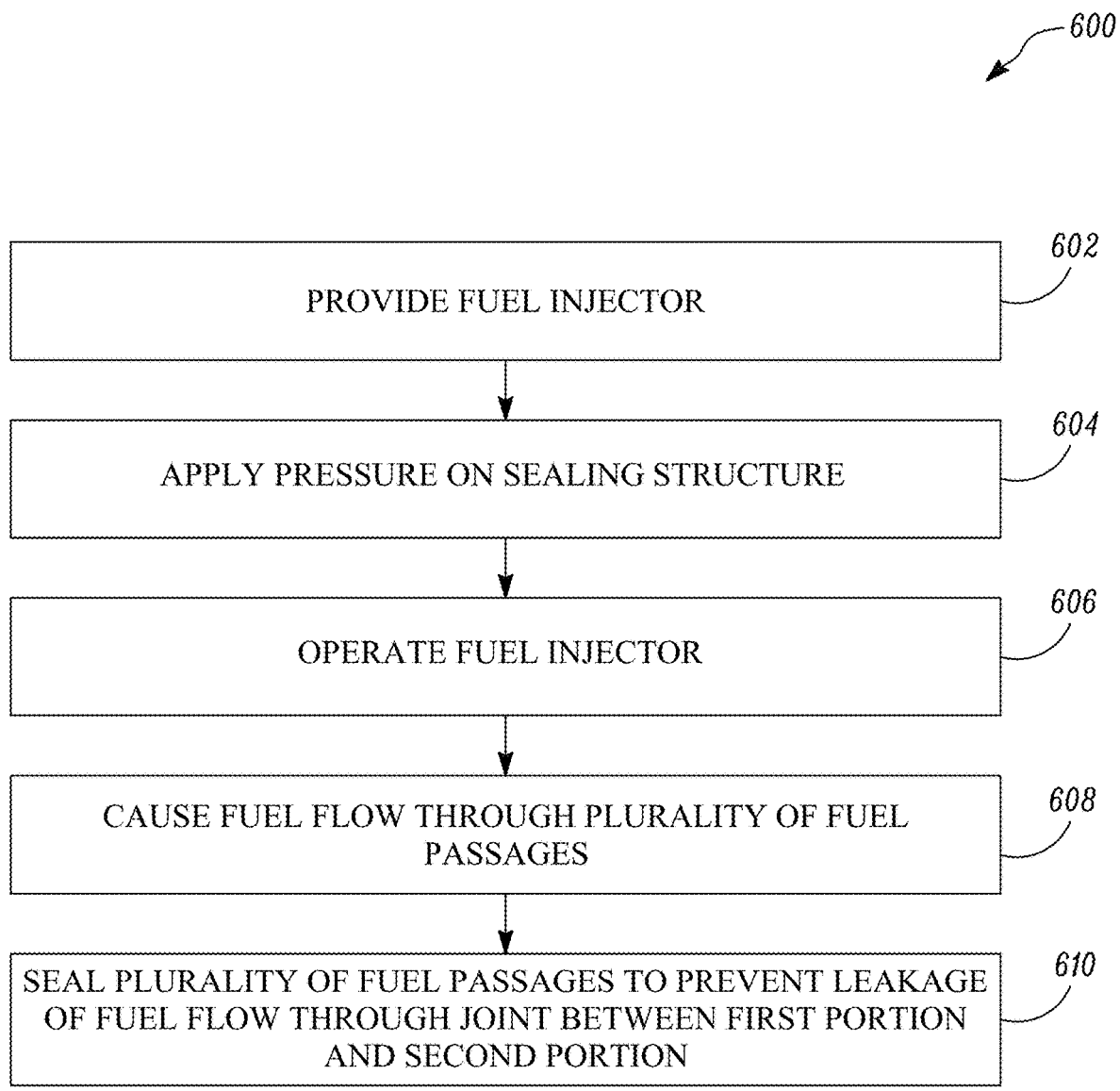
FIG. 6 is a flowchart for a method of fuel injection in the engine of FIG. 1, according to an example of the present disclosure.

FIG. 6 illustrates a flowchart for a method 600 of fuel injection. Referring to FIGS. 1 to 6, at step 602, the fuel injector 200 is provided. The fuel injector 200 includes the body 202 defining the number of fuel passages 204. Each of the number of fuel passages 204 is defined by the first portion 208 of the fuel injector 200 and the second portion 210 of the fuel injector 200. The fuel injector 200 includes the sealing structure 230 disposed between the first portion 208 and the second portion 210. The sealing structure 230 extends circumferentially around the central axis "X1" of the fuel injector 200. The sealing structure 230 includes the ring 232 and the number of lobes 234. Each lobe 234 from the number of lobes 234 accommodates and seals the corresponding fuel passage 204 from the number of fuel passages 204. The fuel injector 200 further includes the number of mechanical fasteners 214 that removably couple the first portion 208 with the second portion 210.

At the step 602, each mechanical fastener 214 from the number of mechanical fasteners 214 is disposed between two circumferentially adjacent lobes 234 from the number of lobes 234. Each of the number of lobes 234 includes the opening 236. At the step 602, the sealing structure 230 is further disposed such that each opening 236 accommodates the corresponding fuel passage 204 from the number of fuel passages 204.

In some examples, the sealing structure 230 further includes the one or more indicators 238, 239 extending from the ring 232 and/or the one or more lobes 234 from the number of lobes 234. In such examples, at the step 602, the sealing structure 230 is correctly positioned relative to the first portion 208 and the second portion 210 using the one or more indicators 238, 239.

At step 604, the number of mechanical fasteners 214 apply the pressure "P" on the sealing structure 230.

At step 606, the fuel injector 200 is operated.

At step 608, the fuel flows through the number of fuel passages 204.

At step 610, the sealing structure 230 and the pressure "P" applied on the sealing structure 230 via the number of mechanical fasteners 214 seal the number of fuel passages 204 to prevent the leakage of the fuel flow through the joint 211 between the first portion 208 and the second portion 210.

In some examples, the first portion 208 defines the first engaging surface 216 facing the sealing structure 230. The first engaging surface 216 defines the cut-out portion 220. In such examples, the method 600 further includes a step (not shown) at which a provision of the cut-out portion 220 isolates the ring 232 of the sealing structure 230 from the first portion 208. The method 600 further includes a step (not shown) at which an application of the pressure "P" on the ring 232 is prevented based on the isolation of the sealing structure 230 from the first portion 208.

It may be desirable to perform one or more of the steps 602, 604, 606, 608, 610 shown in FIG. 6, and/or described above, in an order different from that depicted and/or described. Further, various steps 602, 604, 606, 608, 610 could be performed together.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A sealing system for a fuel injector, the fuel injector including a body defining a plurality of fuel passages, each of the plurality of fuel passages being defined by a first portion of the body and a second portion of the body, the sealing system comprising:
   a sealing structure adapted to be disposed between the first portion and the second portion, wherein the sealing structure extends circumferentially around a central axis of the fuel injector, wherein the sealing structure includes a ring and a plurality of lobes, and wherein each lobe from the plurality of lobes is adapted to accommodate and seal a corresponding fuel passage from the plurality of fuel passages; and a plurality of mechanical fasteners adapted to couple the first portion with the second portion, wherein each of the plurality of mechanical fasteners is adapted to apply a pressure on the sealing structure to seal the plurality of fuel passages.

2. The sealing system of claim 1, wherein the plurality of lobes are disposed such that each mechanical fastener from the plurality of mechanical fasteners is disposed between two circumferentially adjacent lobes from the plurality of lobes.

3. The sealing system of claim 1, wherein each of the plurality of lobes includes an opening, and wherein the opening is adapted to accommodate the corresponding fuel passage from the plurality of fuel passages.

4. The sealing system of claim 3, wherein a shape of the opening of the plurality of lobes corresponds to a shape of the plurality of fuel passages.

5. The sealing system of claim 4, wherein the opening has any one of a circular shape, an elliptical shape, an oval shape, a kidney bean shape, and a polygon shape.

6. The sealing system of claim 1, wherein the sealing structure further includes at least one indicator extending from any one of the ring and one or more lobes from the plurality of lobes, and wherein the at least one indicator is adapted to allow a correct positioning of the sealing structure relative to the first portion and the second portion.

7. The sealing system of claim 1, wherein the sealing structure is made of a metal or a metal alloy.

8. A fuel injector, comprising:
a body defining a plurality of fuel passages, wherein the body extends circumferentially around a central axis of the fuel injector, wherein the body includes a first portion and a second portion, and wherein each of the plurality of fuel passages is defined by the first portion of the body and the second portion of the body; and
a sealing system that seals the plurality of fuel passages in the fuel injector, wherein the sealing system includes:
a sealing structure disposed between the first portion and the second portion, wherein the sealing structure extends circumferentially around the central axis of the fuel injector, wherein the sealing structure includes a ring and a plurality of lobes, and wherein each lobe from the plurality of lobes accommodates and seals a corresponding fuel passage from the plurality of fuel passages; and
a plurality of mechanical fasteners that removably couple the first portion with the second portion, wherein each of the plurality of mechanical fasteners applies a pressure on the sealing structure to seal the plurality of fuel passages.

9. The fuel injector of claim 8, wherein the plurality of lobes are disposed such that each mechanical fastener from the plurality of mechanical fasteners is disposed between two circumferentially adjacent lobes from the plurality of lobes.

10. The fuel injector of claim 8, wherein each of the plurality of lobes includes an opening, and wherein the opening is adapted to accommodate the corresponding fuel passage from the plurality of fuel passages.

11. The fuel injector of claim 10, wherein a shape of the opening of the plurality of lobes corresponds to a shape of the plurality of fuel passages.

12. The fuel injector of claim 11, wherein the opening has any one of a circular shape, an elliptical shape, an oval shape, a kidney bean shape, and a polygon shape.

13. The fuel injector of claim 8, wherein the sealing structure further includes at least one indicator extending from any one of the ring and one or more lobes from the plurality of lobes, and wherein the at least one indicator is adapted to allow a correct positioning of the sealing structure relative to the first portion and the second portion.

14. The fuel injector of claim 8, wherein the sealing structure is made of a metal or a metal alloy.

15. The fuel injector of claim 8, wherein the first portion defines a first engaging surface facing the sealing structure, wherein the first engaging surface defines a cut-out portion, and wherein the cut-out portion isolates the ring of the sealing structure from the first portion.

16. A method of fuel injection, the method comprising:
providing a fuel injector, the fuel injector including a body defining a plurality of fuel passages, wherein each of the plurality of fuel passages is defined by a first portion of the body and a second portion of the body, wherein the fuel injector includes a sealing structure disposed between the first portion and the second portion, wherein the sealing structure extends circumferentially around a central axis of the fuel injector, wherein the sealing structure includes a ring and a plurality of lobes, wherein each lobe from the plurality of lobes accommodates and seals a corresponding fuel passage from the plurality of fuel passages, and wherein the fuel injector further includes a plurality of mechanical fasteners that removably couple the first portion with the second portion;
applying, via the plurality of mechanical fasteners, a pressure on the sealing structure;
operating the fuel injector;
causing a fuel flow through the plurality of fuel passages; and
sealing, via the sealing structure and the pressure applied on the sealing structure via the plurality of mechanical fasteners, the plurality of fuel passages to prevent a leakage of the fuel flow through a joint between the first portion and the second portion.

17. The method of claim 16, wherein the step of providing the fuel injector includes disposing each mechanical fastener from the plurality of mechanical fasteners between two circumferentially adjacent lobes from the plurality of lobes.

18. The method of claim 16, wherein each of the plurality of lobes includes an opening, and wherein the step of providing the fuel injector includes disposing the sealing structure such that each opening accommodates a corresponding fuel passage from the plurality of fuel passages.

19. The method of claim 16, wherein the sealing structure further includes at least one indicator extending from any one of the ring and one or more lobes from the plurality of lobes, and wherein the step of providing the fuel injector includes correctly positioning of the sealing structure relative to the first portion and the second portion using the at least one indicator.

20. The method of claim 16, wherein the first portion defines a first engaging surface facing the sealing structure, and wherein the first engaging surface defines a cut-out portion, the method further comprising:
isolating, via a provision of the cut-out portion, the ring of the sealing structure from the first portion; and preventing an application of the pressure on the ring based on the isolation of the sealing structure from the first portion.

\* \* \* \* \*